United States Patent Office 3,479,153
Patented Nov. 18, 1969

3,479,153
METHOD FOR THE QUALITATIVE IDENTIFICATION OF POLYBUTADIENE ELASTOMER
Panagiotis L. Panagoulias, Highland Park, Mich., assignor to the United States of America as represented by the Secretary of the Army
No Drawing. Filed Mar. 2, 1967, Ser. No. 621,105
Int. Cl. G01n 33/44, 31/06
U.S. Cl. 23—230                                    7 Claims

ABSTRACT OF THE DISCLOSURE

A method for the qualitative identification of polybutadiene comprising the steps of: reacting a test sample with a hydrazine; oxidizing the product of the first step; and adding nitric acid to said reacted and oxidized test sample; said method yielding an unstable polybutadiene diazonium nitrate when said test sample contains polybutadiene alone or in a compound.

---

The invention described herein may be manufactured and used by or for the Government for governmental purposes without the payment to me of any royalty thereon or therefor.

The present invention relates to a method for the qualitative identification of polybutadiene. More particularly, the invention relates to a non-pyrolytic, catalytic, addition reaction suitable for identifying polybutadiene elastomers.

The qualitative methods for the identification of elastomers in general, and polybutadiene in particular, which have been utilized in the prior art are begun almost universally by an initial pyrolysis which causes destructive distillation of the test sample. Subsequently, the vapors produced by said distillation are analyzed. The analysis is accomplished by reacting the vapors produced by the destructive distillation with one or more reagent solutions, which reaction produces a specific color identification. These methods very often yield ambiguous results, particularly when a number of elastomer compounds are present in the same test sample and the products of their individual distillations are mixed and then passed together through the reagent solutions, to yield, at one time, the variety of colored reaction products which indicate the presence of each of the individual elastomers.

The present invention eliminates the necessity for pyrolysis of the test samples and provides a method which, by addition of certain chemical compounds to a properly prepared test sample, yields a distinct color reaction which provides a specific identification for the presence of polybutadiene. The polybutadiene is identified by using a specific procedure which eliminates the interference of other polymers or mixtures of polymers which may be present in the test sample.

It is therefore an object of the present invention to provide a method for the qualitative identification of polybutadiene under all conditions of occurrence.

Another object of the present invention is the provision of a non-pyrolytic and specific color producing method for the qualitative identification of polybutadiene elastomers under all conditions of occurrence.

Still another object of the present invention is the provision of a method of qualitatively identifying polybutadiene elastomers present as mixtures or compounds with other elastomers.

The following description will reveal other objects and advantages of this invention to those skilled in analytical arts.

According to the present invention there is provided a non-pyrolytic method for qualitative identification of polybutadiene under all conditions of occurrence.

More particularly, the invention provides a color producing qualitative identification of polybutadiene under all conditions of occurrence comprising the steps of: reacting a test sample with a hydrazine, and preferably phenylhydrazine, oxidizing the product of the reaction, in a preferred embodiment in the presence of mercuric acetate, and adding nitric acid to said reacted and oxidized test sample; the product is a colored solution. When the preferred reagents are used, a red-brown solution results when the test sample contains polybutadiene alone or as a compound or mixture with other elastomers.

There is thus substituted for the pyrolysis and vapor analysis of the prior art, a strictly chemical test having procedures which eliminate the effects or interference of any elastomers other than polybutadiene which may be present as compounds or mixtures therewith.

According to the procedures herein disclosed, a portion of the elastomer sample to be tested is cut into small pieces and these pieces extracted with acetone according to ASTM Procedure D–297 for a period of from 8–10 hours. The purpose of this extraction is to remove all traces of vulcanization, as such it is primarily precautionary and may be included or omitted according to the nature of the sample being tested. The extracted sample is air dried at room temperature and then transferred to a test tube containing 70 ml. of 2,2,4-trimethylpentane. This compound is chosen as solvent due to its inertness toward nearly all elastomer compounds. The mixture thus formed is refluxed for a period of 2–4 hours to insure proper solution.

The sample solution is then cooled at room temperature and transferred to another test tube containing a mixture of 0.1 g. mercuric acetate and three (3) drops of phenylhydrazine from a glass capillary 4/10 cm. in diameter. This solution is shaken briefly and then refluxed for a 2–4 hour period to provide complete reaction of the sample with phenylhydrazine.

The sample solution is once again cooled at room temperature and 5 ml. of it transferred to another tube containing one (1) drop of nitric acid ($HNO_3$) (Sp. gr. 1.42) from a glass capillary 4/10 cm. in diameter. This mixture is shaken for 1–2 minutes. The appearance of a red-brown color indicates the presence of polybutadiene.

The color reaction occurs when the phenylhydrazine reacts additively with the double bond as follows:

$(-CH_2-CH=CH-CH_2-) + H_2N-NH-\phantom{X} \longrightarrow$ $(-CH_2-CH_2-CH-CH_2-)$
$\phantom{XXXXXXXXX}|$
$\phantom{XXXXXXXXX}NH-NH-\phantom{X}$

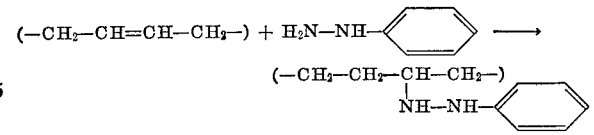

This product is then oxidized, preferably in the presence of mercuric acetate $Hg(OOCCH_3)_2$, to form a diazo compound as follows:

$(-CH_2-CH_2-CH-CH_2-) + Hg(OOCCH_3)_2 \longrightarrow$
$\phantom{XXXXX}|$
$\phantom{XXXXX}NH-NH-\phantom{X}$ $(-CH_2-CH_2-CH-CH_2-) + 2CH_3COOH + Hg$
$\phantom{XXXXXXXXXXXX}|$
$\phantom{XXXXXXXXXXXX}N=N-\phantom{X}$

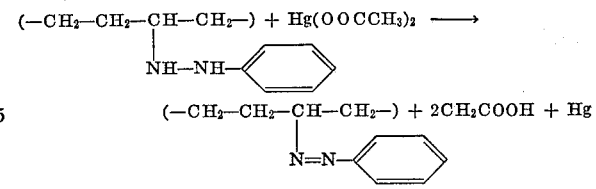

This diazo compound when added to the HNO₃ is split to form a polybutadiene-diazonium nitrate and nitrol as follows:

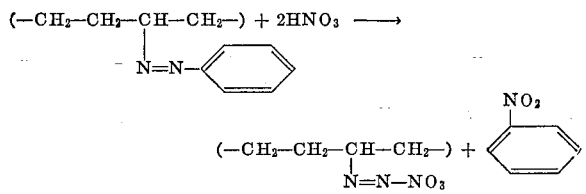

The diazonium nitrate being unstable, it in turn splits to nitrobutadiene

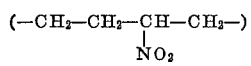

and nitrous oxide N₂O. However, before so splitting the nitrate yields the red-brown color indicative of the presence of polybutadiene.

Thus, the addition of the phenylhydrazine to the polybutadiene, the subsequent catalytic oxidation with the acetate and finally the fissure with nitric acid yield a color producing nitrogen compound, the presence of which serves as a specific test for the presence of polybutadiene elastomers.

What is claimed is:

1. A method for the qualitative identification of polybutadiene rubber comprising the steps of:
    (a) reacting a test sample with phenylhydrazine;
    (b) oxidizing the product of step 1(a), with mercuric acetate; and
    (c) adding nitric acid to said reacted and oxidized test sample to produce an unstable polybutadiene diazonium nitrate when said test sample contains a polybutadiene elastomer.

2. A method in accordance with claim 1 wherein said test sample is dissolved in 2,2,4-trimethylpentane to form a test sample solution prior to reaction of said test sample with said hydrazine.

3. A method in accordance with claim 1 wherein said test sample is extracted with acetone according to ASTM Procedure D-297 for an 8 to 10 hour period prior to reaction with said hydrazine.

4. A method in accordance with claim 2 wherein said test sample is extracted with acetone according to ASTM Procedure D-297 for an 8 to 10 hour period prior to dissolving said test sample in said 2,2,4-trimethylpentane.

5. A method in accordance with claim 2 wherein said test sample solution is refluxed for a two to four hour period prior to reacting said test sample with said hydrazine in order to insure proper and complete dissolving of said test sample in said 2,2,4-trimethylpentane.

6. A method in accordance with claim 2 wherein said test sample solution is refluxed for a two to four hour period subsequent to said oxidation of said test sample and prior to said addition of nitric acid.

7. The method of claim 1 wherein said unstable polybutadiene diazonium nitrate produces a red-brown color.

References Cited

Burchfield, H., Chem. Abstr. 40, 3292², 1946.
Mans, E. B., Chem. Abstr. 57, 997f, 1962.
ASTM Standards on Rubber Products, 1957, pp. 132, 133, TS1892A45.

MORRIS O. WOLK, Primary Examiner

R. M. REESE, Assistant Examiner